March 18, 1952          M. McMATH          2,589,720
ELECTRONIC DEVICE
Filed Oct. 18, 1950
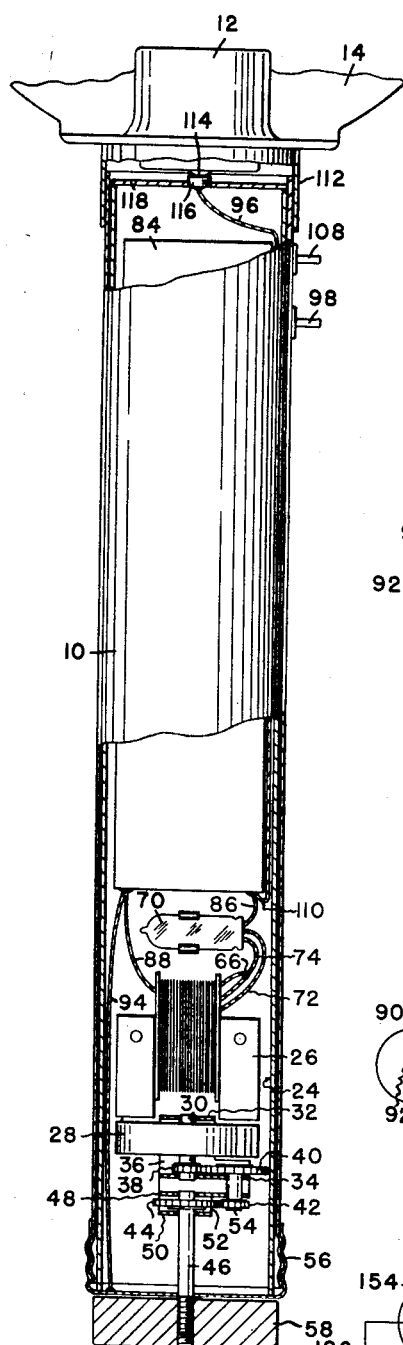
FIG. 1
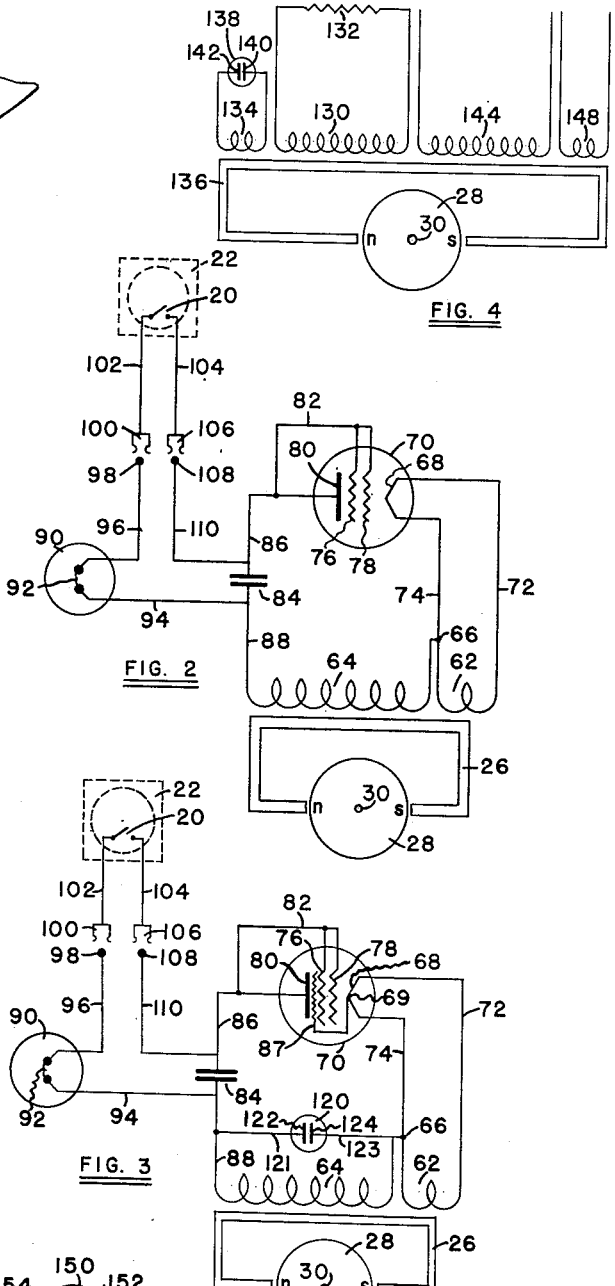
FIG. 4
FIG. 2
FIG. 3
FIG. 5
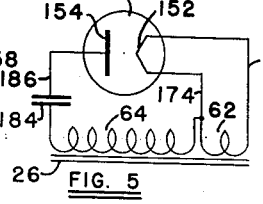
INVENTOR.
MARL McMATH
BY
ATTORNEY Patented Mar. 18, 1952

2,589,720

UNITED STATES PATENT OFFICE 2,589,720

ELECTRONIC DEVICE

Marl McMath, Newport, Ky., assignor to Graflex, Inc., Rochester, N. Y., a corporation of Delaware Application October 18, 1950, Serial No. 190,834

8 Claims. (Cl. 320—1)

This invention relates to a method of and circuit for automatically limiting the voltages induced within an electrical induction generator.

An object of the invention is to provide a simple, compact, highly efficient, dependable means for automatically limiting the maximum voltages generated by portable, manually operable generating devices, that is, in those instances wherein the likelihood of developing voltages in excess of those required or for which the equipment was designed is possible; in other words, the induced voltage generated is limited to a predetermined value.

Another object of the invention is to provide a compact, manually operable battery eliminator for use with commercially available photographic flash units of the type which utilize ignition type flash bulbs which are discarded after being used but once. Such flash units usually include a battery case for the reception of three dry cells. The battery eliminator of the present invention is bodily receivable within the battery case in lieu of the batteries, thereby permitting the user of the device to manually generate and then indefinitely store a bulb flashing charge of electrical energy.

A further object of the invention is to provide a compact, manually operable capacitor charging means which includes novel, compact rectifying means for positively precluding leakage of the charge from the capacitor back into the generating circuit.

Still a further object of the invention is to provide a compact, high efficiency circuit for charging a capacitor with a predetermined or limited amount of electrical energy.

These and other objects are attained by the means described herein and as disclosed in the accompanying drawings, in which:

Fig. 1 is a side view, partly in section, of a battery case of a photographic flash bulb device, the batteries of which have been replaced by the battery eliminator of the present invention.

Fig. 2 is a schematic circuit diagram of the battery eliminator of Fig. 1.

Fig. 3 is a modification of the circuit diagram of Fig. 2.

Fig. 4 is a circuit diagram of a control circuit for limiting the voltages induced within the windings of an induction generator, embodying the teachings of the present invention.

Fig. 5 is a schematic view of a diode tube the operating characteristics of which are similar to those of the power output pentode tube of Fig. 3.

One of the problems which has long confronted the electrical industry is the provision of simple, fully automatic, non-mechanical, foolproof, yet inexpensive means for limiting to predetermined values the voltages induced within an electrical induction generator. The problem of developing voltages in excess of those required or in excess of those for which the energy-using equipment was designed may become quite acute in those instances wherein the generator driving means is or is likely to be variable. The problem therefore is most pronounced when manual means are used for directly or indirectly deriving the generating means.

With particular reference now to Fig. 1, the numeral 10 denotes generally the battery case of a commercially available battery operated flash bulb device which includes a flash bulb socket 12 and a reflector 14 which are secured to one end thereof.

The numerals 108 and 98 denote prongs or plugs which are receivable in the socket of suitable circuit closing means 20 correlated with the shutter actuating mechanism of a camera 22, Fig. 2.

I have provided a housing 24 which is dimensioned to substantially fill the interior of battery case 10 and thereby replace the three dry cells which the casing was designed to accommodate.

Interiorly of and secured to housing 24 I have provided a compact, manually operable generator comprising a fixed armature 26 and a rotating field in the form of a permanent magnet type two-pole rotor 28 including shaft 30 suitably journaled in legs 32 and 34 of a U-shaped mounting bracket 36. The rotor may be suitably driven by any suitable means, such as, by way of example and not restriction, a gear train comprising gears 38, 40, 42 and 44, wherein gear 44 is secured to and carried by spindle 46 rotably journaled in legs 48 and 50 of mounting bracket 52. Gears 40 and 42 are secured to and carried by shaft 54 journaled in legs 32 and 48. The free outer end of spindle 46 passes through cap 56, terminating in a key or knob portion 58.

As best disclosed in Fig. 2, the armature is provided with a low voltage winding 62 and a high voltage winding 64. The low voltage winding is connected by conductors 72 and 74 to filament 68 of a power output pentode tube, such as a type P-10 Sonotone hearing aid tube 70, which is used as a compact, inexpensive, high efficiency rectifier.

The screen grid 76 and the control grid 78 are connected together and to plate 80 by conductor 82, said plate being connected to one side of capacitor 84 by conductor 86. In actual practice a suppressor grid 87, illustrated only in Fig. 3, is disposed between screen grid 76 and plate 80, said grid being connected interiorly of the tube to the apex of filament 69, as at 69.

The other side of the capacitor is connected by conductor 88 to one side of the high voltage winding 64, the other side of which may be connected, as at 66, to filament 68. From the foregoing it will be observed that the capacitor is in series with its charging circuit.

The discharge circuit of the capacitor comprises an ignition type flash tube 90 including a filament 92, one side of which is connected to one side of the capacitor by conductor 94. The other side of the filament is connected through conductor 96, plug 98, jack 100, conductor 102, switch means 20, conductor 104, jack 106, plug 108 and conductor 110 to the other side of the capacitor.

With reference now to Fig. 1, it will be noted that conductor 94 does not, as disclosed in the circuit diagram of Fig. 2, connect directly to one side of the tube filament. Instead conductor 94 is secured to cap 56 which threadably engages the outer end of casing 10, the other end of which casing is secured to collar 112 to which one of the electrodes of socket 12 is electrically connected.

It will be understood that in those instances wherein casing 10 is fabricated from a non-conducting material a suitable internal conductor will be provided for completing an electrical path between cap 56 and one electrode of socket 12.

Plug 16 is connected to the second electrode 114 of socket 12 by means of contactor button 116 secured to and carried by the inner closed end 118 of housing 24, as illustrated.

It has been conclusively proven that the circuit of Fig. 2 when embodied in a housing such as 24, Fig. 1, will produce results far superior to those obtainable when fresh new dry batteries are used in housing 10. In fact, I have found that up to twenty ignition type flash bulbs, when parallel connected, may be effectively flashed when located as far as one hundred feet from casing 10, thereby enabling photographers to obtain maximum flexibility from a single source of compact, easily portable electrical energy.

In the preferred embodiment of the invention, suitable means, such as by way of example a voltage limiting device, are provided across the high voltage winding for continuously and automatically limiting the maximum voltage induced within high voltage winding 64. By thus limiting the maximum voltage which may be induced in this winding, I have efficiently and effectively eliminated the likelihood of excess voltages being developed in capacitor 84 which voltages would, if delivered to the contact points of the circuit closing mechanism in the camera, result in excessive arcing of those points with resultant damage thereto.

By thus limiting the voltage generated in the high voltage coil, damage to the condenser as a result of excess charging is likewise eliminated.

As illustrated in Fig. 3, an inexpensive, simple, yet highly effective means for limiting the voltage delivered by the high voltage coil may comprise an electronic gas discharge tube 120, such as, by way of example, but not by way of restriction, a commercially available 60-volt neon tube series connected across coil 64 as by conductors 121 and 123. As used herein, the term 60-volt neon tube means that ionization of the gas within the envelope will not be ionized to conduct current across and between plates 122 and 124 until the potential developed across or between the plates is 60 volts or greater.

The actual ionizing voltage of tube 120 is therefore such as to limit the voltage developed across the high voltage coil to a predetermined value the magnitude of which is less than the rated operating voltage of the condenser, and of a value sufficiently low as to preclude excessive arcing of the contact points of the circuit closing mechanism.

In this manner I have effectively eliminated the instantaneous peak value of the alternating current voltage induced in the high voltage coil, which peak voltage is limited to, in the sense that it cannot exceed, the ionizing voltage of tube 120, due to the shorting effect of the tube.

It should, of course, be understood that the wattage rating of tube 120 and of the rectifier tube should in all instances exceed the maximum wattage delivered by the generator.

With reference now to Fig. 4, I have illustrated a modified form of a circuit for continuously and automatically limiting the effective out-put voltage of an induction type generator. In the example, the controlled or work circuit includes an induction coil 130 of a suitable number of windings for developing a desired potential such as, by way of example, through resistor 132, which represents the load or power-consuming device operating on the voltage induced within coil 130.

A second or control coil 134 wound about the same armature 136 of the generator is connected in series with a Geisler tube, such as, by way of example, a commercially available neon glow tube or lamp 138. When the voltage induced within coil 134 reaches the ionizing voltage of tube 138, current will flow between plates 140 and 142, thereby completing an electrical circuit through coil 134, the effect of which is to provide a power-absorbing device which will, in effect, prevent a further rise of potential in coil 130. Stated another way, the overall effect of the establishment of an ionizing voltage within tube 138 is to limit the further induction of electrical energy from armature 136 into coil 130.

It will be noted that by properly correlating the ionizing voltage ratings of tube 138 with the optimum desired effective voltage induced in coil 130 a control tube such as 138, having a comparatively low ionizing voltage, may be utilized for effectively limiting to comparatively high values the voltages induced in coil 130. Thus the voltage required to operate the control tube may be less than, equal to, or greater than the voltage induced within coil 130.

It should be understood that coil 134 may be wound under, to the side of, or on the top of coil 130 so long as the coils are wound about the common armature 136. It will further be noted that one control circuit, including a single coil 134 and a single control tube 138, may be utilized for simultaneously and effectively limiting to different values the voltages induced within more than one energy consuming circuit, such as, by way of example, circuits embodying coils 144 and 148, thereby greatly enhancing the utility of the device. That is, a plurality of coils 134, 130, 144 and 148 may be provided about a common armature wherein a different voltage will be induced within each of said coils. The maximum voltages induced within each of these independent circuits may be controlled by one control circuit comprising control winding 134 and gaseous discharge tube 138.

As hereinbefore explained, such a control circuit is particularly useful in those instances wherein the rotor of the generator is manually driven, directly or indirectly through a spring or a gear train such as, by way of example, illustrated in Fig. 1 of the drawings. When manual driving means are utilized, the quantity of electrical energy generated as well as the rate of generation will vary considerably. Heretofore variations in the rate and quantity of electrical energy generated quite often resulted in the generation of voltage peak values in excess of those desired with objectionable results.

In Fig. 5 I have illustrated a diode tube the operating characteristics of which are the equivalent of those of the modified pentode power tubes 70 of Figs. 2 and 3. The numeral 150 denotes generally a sealed evacuated envelope containing a filament type cathode 152 and a plate or anode 154. The numerals 172, 174, 186 and 184 are counterparts of conductors 72, 74, and 86 and capacitor 84 of Figs. 2 and 3.

Exhaustive tests of the device of Fig. 1 embodying the circuit of Fig. 3 have conclusively proven satisfactory operation at temperatures as low as 67° F. below zero.

It should be clearly understood that whereas I have illustrated and described the device as a battery eliminator for use with photographic flash lamp equipment, such use is exemplary rather than restrictive. The device is ideally suited as an efficient, rugged, foolproof, manually operable igniter which may replace presently used battery-type igniters.

If desired, a cold cathode gaseous thermionic tube may be utilized in lieu of tubes 70 and 150. The expression thermionic valve used in certain of the claims is a generic term comprehending rectifiers comprising high vacuum type thermionic tubes such as, by way of example, the pentode power output tube 70 of Figs. 2 and 3, the diode 150 of Fig. 5 and, of course, cold cathode gaseous thermionic tubes.

In conclusion it will be noted that rectification means such as the oxide types and/or the crystal types are not suitable due to their inherently high back leakage characteristics which would result in undesirable loss of the capacitor charge back into the charging circuit. Such leakage losses are entirely absent from thermionic rectifiers.

This application is a continuation in part of my co-pending patent application Serial No. 153,117, filed March 31, 1950.

What is claimed is:

1. A self-contained, portable, manually operable device for generating and storing electrical energy to operate ignition type photo flash lamps, which comprises, in combination, an alternating current generator having a rotating field and a stationary armature provided with a high and a low voltage winding, manually operable means for imparting rotary motion to said field, a capacitor, a rectifier comprising a sealed envelope containing a filament and a plate, said filament series connected with said low voltage winding, said plate connected to one side of said capacitor, the other side of said capacitor connected to one side of the high voltage winding of said armature, the other side of said winding connected to the filament of said rectifier, gaseous discharge means series connected across said high voltage winding for limiting the voltage delivered by said winding to the ionizing voltage of said means.

2. An electrical control circuit for limiting the voltage induced within the armature winding of an induction generator, said control circuit including gaseous discharge means in series with the armature winding of the generator for limiting the voltage delivered by said winding to values determined by the ionizing voltage of said means.

3. A control circuit for limiting the voltage induced within each of a plurality of windings inductively coupled to a common armature, said control circuit including a gaseous discharge tube in series with one of said windings for limiting to predetermined values the voltages developed in said windings upon ionization of said tube.

4. A self-contained, portable, manually operable device for generating and storing electrical energy to operate ignition type photo flash lamps, which comprises, in combination, an alternating current generator having a rotating field and a stationary armature provided with a high and a low voltage winding, manually operable means for imparting rotary motion to said field, a capacitor, a rectifier comprising a sealed evacuated envelope containing a filament type cathode and an anode, said filament series connected with said low voltage winding, said anode connected to one side of said capacitor, the other side of said capacitor connected to one side of the high voltage winding of said armature, the other side of said winding connected to the filament of said rectifier, and a control circuit including a gaseous discharge tube series connected to a winding of said armature for limiting the voltages developed in said high and low voltage windings to predetermined values, wherein the control circuit becomes effective upon ionization of said tube.

5. A self-contained, manually operable battery replacement device for generating and storing electrical energy to operate ignition type photo flash lamps, said device comprising in combination a tubular housing dimensioned to be received within the battery case of a conventional battery operated ignition type photo flash lamp unit, said housing containing an alternating current generator having a rotating field and a stationary armature provided with a high and a low voltage winding, manually operable means secured to and carried by said housing for imparting rotary motion to said field, a capacitor and a rectifier contained in said housing, said rectifier comprising a vacuum tube containing a filament type cathode and an anode, said filament series connected with said low voltage winding, said anode connected to one side of said capacitor, the other side of said capacitor connected to one side of the high voltage winding of said armature, the other side of said winding connected to the filament circuit of said rectifier, a control circuit for limiting the voltages developed in said high and low voltage windings to predetermined values, said circuit comprising an ionization tube series connected to a winding of the armature of said generator, contact elements secured to and carried by said housing constructed and arranged to replace the terminal contacts of the batteries replaced by said device, and means for securing said device within said battery case.

6. A self-contained, portable, manually operable battery replacement device for generating and storing electrical energy, which comprises, in combination, a housing containing an alternating current generator having a rotating field and a stationary armature provided with a high and a low voltage winding, manually operable means secured to and carried by said housing for imparting rotary motion to said field, a capacitor and a rectifier contained in said housing, said rectifier comprising a vacuum tube containing a filament type cathode and an anode, said filament series connected with said low voltage winding, said anode connected to one side of said capacitor, the other side of said capacitor connected to one side of the high voltage winding of said armature, the other side of said winding connected to the filament of said rectifier, a control circuit for limiting the voltage developed in said high and low voltage windings to predetermined values, said circuit including an ionization tube series connected to a winding of the armature of said generator, a pair of contact elements secured to and carried by said housing, and means connecting said contact elements to respective terminals of said capacitor.

7. A self-contained, portable, manually operable device for generating and storing electrical energy, which comprises a capacitor, a manually operable induction type generator, including an armature winding, a thermionic valve, said valve, capacitor and armature winding connected in a series circuit, and a control circuit for limiting the voltage induced within said armature winding comprising an ionic gaseous discharge means in series with said armature winding.

8. A self-contained, portable, manually operable battery replacement device for generating and storing electrical energy, which comprises, in combination, a capacitor, a manually operable induction type generator including and armature winding, a thermionic valve, said valve, capacitor and armature winding connected in a series circuit, and a second armature winding in series with an ionic gaseous discharge means, wherein said second armature winding is inductively coupled with said first armature winding.

MARL McMATH.

REFERENCES CITED

The following references are of record in the file of this patent:

UNITED STATES PATENTS

| Number | Name | Date |
|---|---|---|
| 1,939,332 | Bouwers | Dec. 12, 1933 |
| 2,071,370 | Williams | Feb. 23, 1937 |
| 2,285,006 | Bowser | June 2, 1942 |
| 2,285,849 | Wallace | June 9, 1942 |
| 2,290,264 | Wuerfel | July 21, 1942 |
| 2,390,877 | Fisher | Dec. 11, 1945 |
| 2,395,600 | Weisglass | Feb. 26, 1946 |
| 2,409,967 | Weisglass | Oct. 22, 1946 |
| 2,576,934 | Grier | Dec. 4, 1951 |